(12) United States Patent
Hipszki et al.

(10) Patent No.: US 8,580,217 B2
(45) Date of Patent: Nov. 12, 2013

(54) INSULATING MATERIAL FOR ELECTRICAL MACHINES

(75) Inventors: Gyula Hipszki, Budapest (HU); Gerhard Wruss, Stubenberg am See (AT)

(73) Assignee: Siemens AG Österreich, Vienna (AT)

( * ) Notice: Subject to any disclaimer, the term of this patent is extended or adjusted under 35 U.S.C. 154(b) by 678 days.

(21) Appl. No.: 12/525,821

(22) PCT Filed: Feb. 6, 2007

(86) PCT No.: PCT/EP2007/051107
§ 371 (c)(1),
(2), (4) Date: Aug. 5, 2009

(87) PCT Pub. No.: WO2008/095532
PCT Pub. Date: Aug. 14, 2008

(65) Prior Publication Data
US 2010/0028626 A1 Feb. 4, 2010

(51) Int. Cl.
*B32B 3/10* (2006.01)
*C09J 7/02* (2006.01)

(52) U.S. Cl.
USPC .............. 423/343; 428/195.1; 428/211.1

(58) Field of Classification Search
None
See application file for complete search history.

(56) References Cited

U.S. PATENT DOCUMENTS

| 3,246,271 A | 4/1966 | Ford |
| 4,095,557 A | 6/1978 | Croop et al. |
| 4,741,947 A | 5/1988 | Pataki |

FOREIGN PATENT DOCUMENTS

| EP | 0 169 921 A1 | 2/1986 |
| EP | 0287814 B1 | 10/1988 |

*Primary Examiner* — Callie Shosho
*Assistant Examiner* — Cheng Huang

(57) ABSTRACT

An insulating material for an electrical machine that insulates coiled windings is provided. The insulating material includes a carrier material and adhesive coatings on the front and back of the carrier material. The adhesive coatings are mounted and aligned on the front and back of the carrier material in such a way that in the carrier material in the insulation state a direct frictional connection is developed between the adhesive coatings on the front and back.

10 Claims, 3 Drawing Sheets

INSULATING MATERIAL FOR ELECTRICAL MACHINES

CROSS REFERENCE TO RELATED APPLICATIONS

This application is the US National Stage of International Application No. PCT/EP2007/051107, filed Feb. 6, 2007 and claims the benefit thereof.

FIELD OF INVENTION

The invention relates to an insulating material for electrical machines for insulating turns of a wound coil assembly, having a carrier material and adhesive coatings on the front and back sides of the carrier material.

The invention also relates to the use of the insulating material for insulating turns of a wound coil assembly in electrical machines.

BACKGROUND OF THE INVENTION

It has been known for a relatively long time to use an insulating material that is printed on both sides with epoxy resin for the purpose of insulating windings of electrical machines (e.g. transformers, transducers). Typically, said insulating material has a diamond-shaped epoxy resin coating. In technical terminology said insulating material is referred to as "Diamond Pattern Epoxy Coated Paper" (DPP).

An insulating material containing an insulating layer made of an organic polymer is known from European patent application EP 0 287 814 B1. Said European patent application discloses an insulating material having an improved corona resistance, without an increase in the overall thickness of the insulating material being necessary for this.

If the insulation frays or tears, corona discharges can occur between the individual turns of the winding, thereby reducing performance and negatively affecting the service life of the wound coil assembly.

The object of the present invention is to provide an insulating material which offers a high degree of stability in the insulating state.

This object is inventively achieved in the case of an insulating material of the kind cited in the introduction in that the adhesive coatings are applied and aligned on the front and back sides of the carrier material in such a way that in the carrier material a direct frictional connection is developed in the insulation state between the adhesive coatings on the front and back of the carrier material. If a direct frictional connection exists between the points of adhesion of the adhesive coatings on the front and back sides of the carrier material following the baking process (or following the bonding), no shearing forces or only minimal shearing forces are produced between the points of adhesion of the front and back sides. Furthermore, the carrier material (e.g. kraft paper, pressboard, aramid paper, polyester film, textile fiber, or a textile-based material) is also not exposed to any substantial force stress. This has a positive effect on the useful life of the insulating material. In particular, fraying and shearing of the insulating material is prevented by the direct frictional connection, which in turn has a positive effect on the reliability and operational safety of the electrical machine. Because shearing forces are avoided as a result of the direct frictional connection between the points of adhesion on the front and back sides, a high degree of stability is present in the baking (or bonding) of the windings. Moreover, less adhesive material (epoxy resin or another suitable adhesive) is required for the adhesive coatings and in addition the high degree of stability of the baking (or bonding) permits the use of a thin carrier material, thereby reducing the costs of the insulating material. Furthermore, a high degree of stability of the baking prevents a fraying or shearing of the insulating material, thereby avoiding corona discharges between the individual turns of the wound coil assembly.

According to a first advantageous embodiment of the invention, epoxy resin is used as the adhesive material for the adhesive coatings. Epoxy resin as an adhesive material is easy to handle and to apply to the carrier material. Furthermore, epoxy resin possesses advantageous thermochemical properties. Thus, at the time of shipment on the carrier medium the epoxy resin is disposed in what is termed a reactive B-state. Upon being heated to higher temperatures the epoxy resin becomes adhesive and bonds to the turns of the electrical conductors. After a curing time has elapsed the epoxy resin assumes what is termed a C-state and an infusible stable bond exists with the turns of the electrical conductors. The thickness of the epoxy resin coating lies in the region of approx. 0.020 mm per side, depending on the carrier medium.

According to a further advantageous embodiment of the invention, the adhesive coatings on the front and back sides of the carrier material are in each case arranged congruently or virtually congruently with respect to each other. It is thereby ensured that the mechanical loading of the carrier material induced by the adhesive forces is minimized, since no shearing forces are produced in the carrier material owing to the adhesive coatings being disposed opposite each other in each case. Tears and fraying in the carrier material can occur due to shearing forces. The useful life of the insulating material is therefore increased as a result of the avoidance of shearing forces.

According to a further advantageous embodiment of the invention, the adhesive coatings on the front and back sides of the carrier material represent an essentially opposite symmetrical pattern in each case. This arrangement of the adhesive coatings ensures a direct frictional connection between the points of adhesion of the adhesive coatings on the front and back sides of the carrier material. Consequently, no shearing forces act between the points of adhesion on the front and back sides of the carrier material. The opposite symmetrical arrangement of the points of adhesion on the front and back sides of the carrier material in each case ensures that the mechanical loading induced on the carrier material by the adhesive forces is minimized. Among other things, this increases the useful life of the carrier material and therefore also of the insulating material.

According to a further advantageous embodiment of the invention, the adhesive coatings are diamond-shaped. Diamond-shaped adhesive coatings constitute a partial coating on the front and back sides. The partial coating leads to a partial bonding of the turns of the electrical conductors to the insulating material. Consequently there are unglued free spaces present between the insulating material and the turns of the electrical conductors which make a positive contribution to the drying and impregnation process. Moreover, diamond-shaped epoxy resin coatings on transformer pressboard or on kraft paper are also suitable for withstanding the high power levels and voltages in active parts of transformers (in particular power transformers) or transducers, in particular with regard to dielectric or mechanical stresses. A suitable side length of the diamonds lies in the range of 9-10 mm, while a suitable distance between two diamonds (distance between two adjacent side lengths) lies in the range of 5.5-7 mm.

According to a further advantageous embodiment of the invention, the adhesive coatings are circular in shape. The advantage of circular or dot-shaped adhesive coatings lies in the fact that they can easily be applied to the carrier material by pressure or using spray-on techniques. In principle, however, any shape is suitable as long as it is ensured that the adhesive coatings on the front and back sides of the carrier material are positioned congruently opposite each other or are arranged essentially congruently on the front and back sides of the carrier material.

According to a further advantageous embodiment of the invention, transformer pressboard, kraft paper, aramid paper, polyester film, textile fiber or a textile-based material is used as the carrier material. Said materials possess a high degree of deformability and flexibility and are therefore easy to handle. Transformer pressboard and kraft paper additionally possess high electrical breakdown resistance and great tensile strength and consequently can be exposed to extreme voltage stresses. Aramid paper (e.g. NOMEX®) is particularly suitable for satisfying high thermal and dielectric requirements. Textile fibers and textile-based materials are inexpensive and suitable in particular for small voltage ranges.

According to a further advantageous embodiment of the invention, the electrical machine is a transformer, a converter, a transducer or a generator. Extreme dielectric and mechanical stresses often exist in active parts of electrical machines such as e.g. transformers, frequency converters, transducers or generators, adversely affecting the useful life and operational efficiency of the conductor insulation used. If a direct frictional connection is present in the carrier material between the adhesive coatings of the front and back sides, the shearing forces in the carrier material of the insulation are avoided or reduced, thereby resulting in a positive effect on the useful life, operational efficiency and maintenance of the insulation.

A further advantageous embodiment of the invention consists in the use of the inventive insulating material for insulating turns of wound coil assemblies in electrical machines. The service life of power transformers is described in particular by the useful life of the insulation system, since in the event of a mechanical instability of the insulating material there is an increased risk of a dielectric failure and an attendant potential total failure of the transformer. Aging effects and the mechanical and electrical load on the carrier material play a critical role in terms of the useful life of the insulation system. If the carrier medium is not exposed in the insulation state to any shearing forces due to the points of adhesion on the front and back sides, this has a positive effect on the useful life and operational efficiency of the entire insulation system.

BRIEF DESCRIPTION OF THE DRAWINGS

An exemplary embodiment of the invention is explained in more detail below with reference to the drawing, in which.

DETAILED DESCRIPTION OF INVENTION

Figure 1:
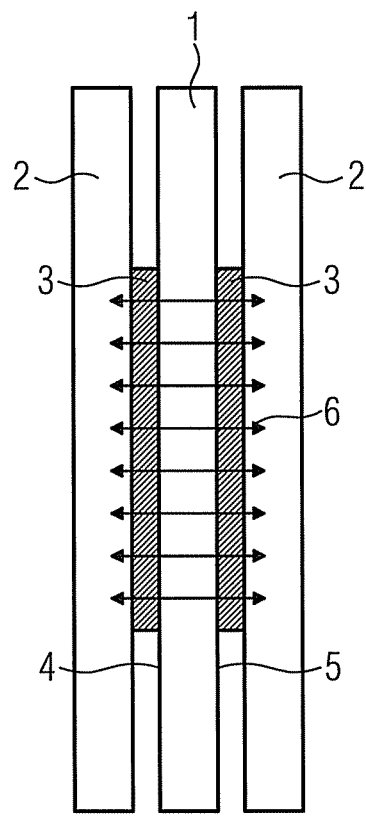
FIG. 1 shows a schematic representation of the frictional connection principle of the present invention.

FIG. 1 shows a schematic representation of the frictional connection principle of the present invention. Adhesive coatings 3 are applied to the carrier material 1 on its front 4 and back 5. As a result of the baking or bonding phase the adhesive coatings 3 come into contact with the turns 2 in the insulation state. Because the adhesive coatings 3 on the front 4 and on the back 5 of the carrier material 1 are arranged directly opposite each other or, as the case may be, are congruent, a direct frictional connection effect is produced between mutually opposing adhesive coatings 3 in each case. Consequently no shearing forces are generated at the carrier material 1, since the force is transferred directly from one side to the other. The following advantages in particular result from the direct frictional connection effect:

High degree of stability of the baking or bonding of the insulating material to the turns 2 of the electrical conductors of an electrical machine (e.g. transformer, transducer, generator)

A higher short-circuit strength resulting therefrom

Less adhesive (e.g. epoxy resin) required for the adhesive coatings

Use of a thinner carrier material

Cost benefits can result from all of the aforementioned points.

Transformer pressboard (e.g. PSP 3055), kraft paper and all other cellulose-, aramid-, polyester- or textile-based materials are suitable as the carrier material 1, depending on the particular dielectric and thermal requirements in each case. The adhesive coatings 3 can consist of epoxy resin or of another appropriate adhesive that is suitable for use in electrical machines (e.g. transformers). The adhesive coatings 3 can be e.g. diamond-shaped, rectangular or dot-shaped. In principle, however, any shape is suitable as long as it is ensured that the adhesive coatings 3 on the front 4 and back 5 of the carrier material 1 are arranged congruently opposite each other.

In electrical machines, in particular in transformers, the electrical conductors of the turns 2 are insulated in particular by means of what are called insulations or insulation systems. By means of a partial coating of the carrier material 1 with adhesive 3 it is ensured that free spaces are produced between the insulating material and the electrical conductor of the turns 2. These free spaces serve to promote the drying process (removal of air and moisture) following the baking or bonding phase and assist oil impregnation.

The mechanical stability of the carrier material 1 has a great influence on the useful life and operational efficiency of an insulation system. The loss of mechanical stability (due to shrinkage, tears, fraying) of the carrier material 1 carries the risk of a dielectric failure and also of a total failure e.g. of a transformer. The present invention ensures that no shearing forces are produced in the carrier material 1, thereby achieving a high level of mechanical stability of the insulating material.

Figure 2:
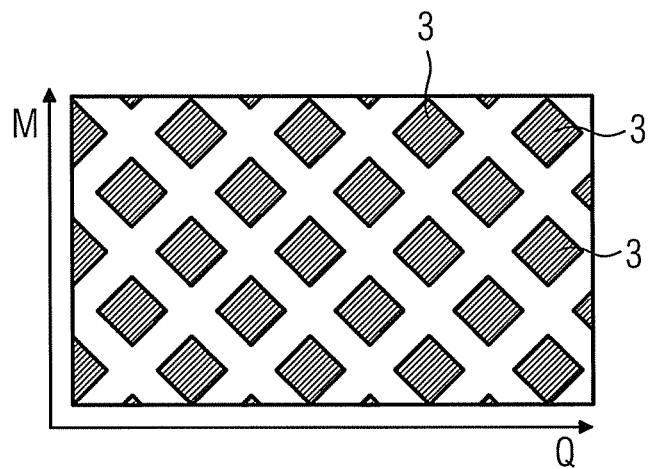
FIG. 2 shows a section of one side of a coated carrier material, wherein the adhesive coating is diamond-shaped.

FIG. 2 shows a section of one side of a coated carrier material 1, wherein the adhesive coating 3 is diamond-shaped. The diamond-shaped adhesive coating enables the advantages of a partial adhesive coating (reliable media interchange between liquid and solid media, as well as a positive impact on the drying process during the baking or bonding phase). A suitable side length of the diamonds lies in the range of 9-10 mm, while a suitable distance between two diamonds (distance between two adjacent side lengths) lies in the range of 5.5-7 mm. The total coverage area per front 4 and back 5 that is provided with the adhesive coatings is typically in the range of 30-40%, though this can vary according to application and requirements. The side length of a diamond and the distance between two diamonds can also vary according to application and requirements. In FIG. 2 the reference sign M indicates the machine direction, and the reference sign Q indicates the transverse direction.

Figure 3:
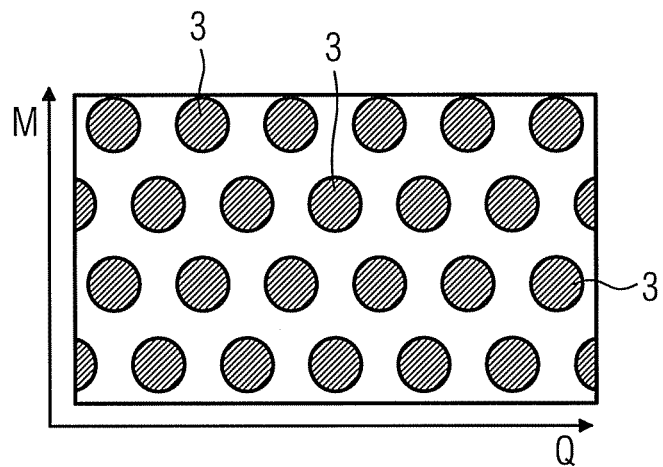
FIG. 3 shows a section of one side of a coated carrier material, wherein the adhesive coating is applied in the form of circular dots.

FIG. 3 shows a section of one side of a coated carrier material, wherein the adhesive coating is applied in the form of circular dots. The advantage of circular or dot-shaped adhesive coatings 3 lies in the fact that they can easily be applied to the carrier material 1 by pressure or using spray-on techniques. The circular or dot-shaped adhesive coatings 3, but also the diamond-shaped adhesive coatings 3, can be applied e.g. in a simple manner in one operation simultaneously onto the front 4 and back 5 of the carrier medium 1 if the means for applying the adhesive coatings are installed accordingly in one device, arranged opposite one another in each case. However, the adhesive coatings 3 can also be applied on the carrier medium 1 in a plurality of operations.

The radius of the circles or dots and the distance between two circles or dots can vary according to application and requirements. The total coverage area per front 4 and back 5 that is provided with the circular or dot-shaped adhesive coatings is typically in the range of 30-40%, though this can vary according to application and requirements.

Figure 4:
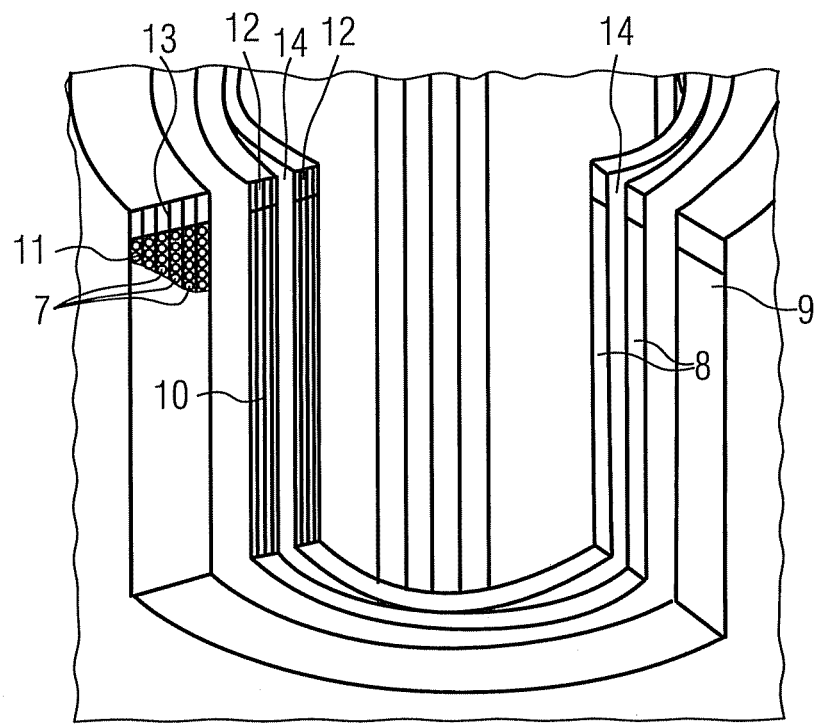
FIG. 4 is a schematic detail view illustrating the use of the inventive insulating material in an electrical machine.

FIG. 4 is a schematic detail view illustrating the use of the inventive insulating material 10, 11 in an electrical machine. The inventive insulating material is employed inter alia in the insulation of turns 2 of wound coil assemblies in electrical machines, such as e.g. transformers, converters, transducers or generators.

According to FIG. 4, the low-voltage winding 8, here in the example in the form of a strip winding, is embodied with a partial cooling gap 14. The high-voltage winding 9 is embodied in FIG. 4 by way of example as a round-wire layer winding. FIG. 4 shows cut-through round wires as electrical conductors 7. The inventive insulating material 10 (conductor insulation of the low-voltage winding) is disposed between the individual turns and therefore establishes the direct frictional connection from one turn to the other. In the high-voltage winding 9, the inventive insulating material 11 is arranged between the layers and constitutes the layer insulation. The edge strips 12, 13 of the low-voltage and high-voltage windings also gain increased stability as a result of the direct frictional connection effect of the points of adhesion.

Figure 5:
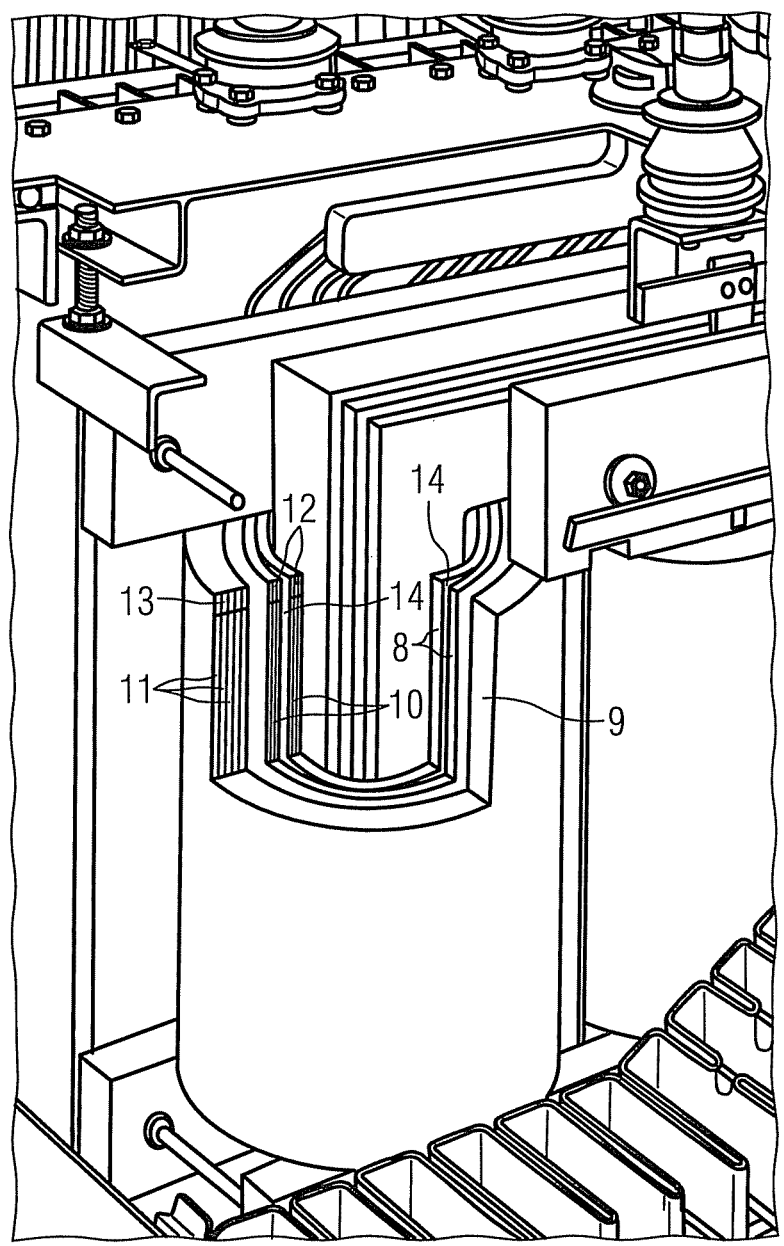
FIG. 5 is a schematic view illustrating the use of the inventive insulating material in a transformer.

FIG. 5 is a cut-away schematic view illustrating the use of the inventive insulating material 10, 11 in a transformer. FIG. 5 shows the use of the inventive insulating material 10, 11 in a transformer, as described with reference to FIG. 4.

Insulating material for electrical machines for insulating turns of wound coil assemblies, comprising a carrier material and adhesive coatings on the front and back sides of the carrier material, wherein the adhesive coatings are applied and aligned on the front and back sides of the carrier material in such a way that a direct frictional connection is established in the carrier material between the adhesive coatings on the front and back sides in the insulation state.

REFERENCE SIGNS

1 Carrier material
2 Turns
3 Adhesive coating
4 Front
5 Back
6 Frictional connection
7 Electrical conductor
8 Low-voltage winding of a transformer
9 High-voltage winding of a transformer
10 Conductor insulation, low-voltage winding
11 Layer insulation, high-voltage winding
12 Edge strip, low-voltage winding
13 Edge strip, high-voltage winding
14 Cooling gap
M Machine direction
Q Transverse direction

The invention claimed is:

1. An insulating material used on an electrical machine for insulating turns of wound coil assemblies, comprising:
a carrier material comprising a front and a back; and
a plurality of adhesive coatings which are applied in a pattern on the front and back of the carrier material,
wherein the plurality of adhesive coatings are located opposite each other on the front and on the back and are arranged congruently with respect to one another such that in the carrier material a direct frictional connection is developed in an insulation state between the plurality of adhesive coatings.

2. The insulating material as claimed in claim 1, wherein an epoxy resin is used as an adhesive material for the plurality of adhesive coatings.

3. The insulating material as claimed in claim 2, wherein a thickness of an epoxy resin coating is essentially 0.020 mm per side.

4. The insulating material as claimed in claim 1, wherein the plurality of adhesive coatings on the front and on the back represent an essentially opposite symmetrical pattern.

5. The insulating material as claimed in claim 4, wherein the plurality of adhesive coatings are diamond-shaped.

6. The insulating material as claimed in claim 5, wherein a side length of each diamond is in a range of 9-10 mm.

7. The insulating material as claimed in claim 5, wherein a distance between two adjacent side lengths of two diamonds is in the range of 5.5-7 mm.

8. The insulating material as claimed in claim 4, wherein the plurality of adhesive coatings are circular in shape.

9. The insulating material as claimed in claim 1, wherein transformer pressboard, kraft paper, aramid paper, polyester film, textile fiber or a textile-based material is used as the carrier material.

10. The insulating material as claimed in claim 1, wherein the electrical machine is a transformer, a converter, a transducer or a generator.

* * * * *